United States Patent
Bhogal et al.

(10) Patent No.: US 9,275,371 B2
(45) Date of Patent: Mar. 1, 2016

(54) KEEPING TRACK OF A DETACHED E-MAIL ATTACHMENT

(75) Inventors: Kulvir S. Bhogal, Fort Worth, TX (US); Kwang S. Kang, Austin, TX (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 3221 days.

(21) Appl. No.: 11/186,708

(22) Filed: Jul. 21, 2005

(65) Prior Publication Data

US 2007/0022166 A1    Jan. 25, 2007

(51) Int. Cl.
*G06F 15/16* (2006.01)
*G06Q 10/10* (2012.01)

(52) U.S. Cl.
CPC .................... *G06Q 10/107* (2013.01)

(58) Field of Classification Search
CPC .................................................. G06Q 10/107
USPC ................... 709/206, 203, 217, 200; 715/530
See application file for complete search history.

(56) References Cited

U.S. PATENT DOCUMENTS

| | | | |
|---|---|---|---|
| 6,230,197 B1 | 5/2001 | Beck et al. | |
| 6,505,236 B1* | 1/2003 | Pollack | 709/206 |
| 6,631,496 B1* | 10/2003 | Li et al. | 715/200 |
| 6,725,228 B1 | 4/2004 | Clark et al. | |
| 6,915,333 B2* | 7/2005 | Delia et al. | 709/206 |
| 7,003,551 B2* | 2/2006 | Malik | 709/206 |
| 7,181,463 B2* | 2/2007 | Moore et al. | 707/102 |
| 7,249,056 B1* | 7/2007 | Crouthamel et al. | 705/26 |
| 2002/0049727 A1* | 4/2002 | Rothkopf | 707/1 |
| 2002/0059384 A1* | 5/2002 | Kaars | 709/206 |
| 2002/0083064 A1* | 6/2002 | Davis et al. | 707/100 |
| 2002/0095454 A1* | 7/2002 | Reed et al. | 709/201 |
| 2002/0128891 A1 | 9/2002 | McSherry | |
| 2003/0046315 A1* | 3/2003 | Feig | 707/512 |
| 2003/0188263 A1* | 10/2003 | Bates et al. | 715/513 |
| 2004/0010543 A1* | 1/2004 | Grobman | 709/203 |
| 2004/0015556 A1* | 1/2004 | Chopra | G06Q 10/10 709/206 |
| 2004/0024826 A1* | 2/2004 | Halahmi et al. | 709/206 |
| 2004/0068545 A1 | 4/2004 | Daniell et al. | |
| 2004/0158607 A1 | 8/2004 | Coppinger et al. | |
| 2004/0203947 A1 | 10/2004 | Moles | |
| 2005/0004978 A1* | 1/2005 | Reed et al. | 709/203 |
| 2005/0033811 A1* | 2/2005 | Bhogal et al. | 709/206 |
| 2005/0091324 A1* | 4/2005 | Flocken | 709/206 |
| 2005/0114658 A1* | 5/2005 | Dye et al. | 713/165 |
| 2006/0031309 A1* | 2/2006 | Luoffo et al. | 709/206 |
| 2006/0178926 A1* | 8/2006 | Kaisermayr et al. | 705/9 |

* cited by examiner

*Primary Examiner* — Gerald Smarth
(74) *Attorney, Agent, or Firm* — Yee & Associates, P.C.; Parashos Kalaitzis

(57) ABSTRACT

A system, computer program product and method of keeping track of an attachment that has been detached from an e-mail message are provided. Generally, a table on which an attachment that has been detached from an e-mail message is cross-referenced to its storage location is used. Further, a link is inserted into the e-mail message to facilitate access to the detached attachment. If the attachment is ever moved from its storage location to a new storage location, the cross-referencing table is updated to reflect the new storage location. The link is also updated to facilitate access to the attachment at the new storage location.

18 Claims, 7 Drawing Sheets

| 505<br>ELECTRONIC FILES | 510<br>LOCATION STORED | 515<br>E-MAIL MESSAGES |
|---|---|---|
| $FILE_1$ | $LOCATION_1$ | $E\text{-}MAIL_1$ |
| $FILE_2$ | $LOCATION_2$ | $E\text{-}MAIL_2$ |
| ∘<br>∘<br>∘ | ∘<br>∘<br>∘ | ∘<br>∘<br>∘ |

FIG. 5(a)

| 505<br>ELECTRONIC FILES | 510<br>LOCATION STORED | 515<br>E-MAIL MESSAGES |
|---|---|---|
| $FILE_1$ | $LOCATION_{a1}$ | $E\text{-}MAIL_1$ |
| $FILE_2$ | $LOCATION_2$ | $E\text{-}MAIL_2$ |
| ∘<br>∘<br>∘ | ∘<br>∘<br>∘ | ∘<br>∘<br>∘ |

FIG. 5(b)

| 505 ELECTRONIC FILES | 510 LOCATION STORED | 515 E-MAIL MESSAGES |
|---|---|---|
| $FILE_1$ | $LOCATION_{a1}$ | $E\text{-}MAIL_1$ |
| ○ ○ ○ | ○ ○ ○ | ○ ○ ○ |

FIG. 5(c)

KEEPING TRACK OF A DETACHED E-MAIL ATTACHMENT

BACKGROUND OF THE INVENTION

1. Technical Field

The present invention is directed to electronic mail systems. More specifically, the present invention is directed to a system, apparatus and method of keeping track of an e-mail attachment that has been detached from an e-mail message.

2. Description of Related Art

Electronic mail or e-mail is the transmission of messages over communications networks from a sender to a recipient. An e-mail generally has two parts: a header, which includes the e-mail addresses of the sender and the recipient as well as the subject matter of the e-mail and a body, which includes the message itself. As is well known, the message can be a note entered using a keyboard and/or an electronic file. When an electronic file is the message or makes up part of the message, the electronic file is generally appended or attached to the body of the e-mail. The attached file may be accessed using an application program such as the one with which the file was created.

At some companies, e-mail messages of employees are kept on servers. To keep the storage space used on those servers at a minimum, attached files are generally detached from e-mail messages upon receipt. When a file is detached from an e-mail message, it is ordinarily stored locally (e.g., on a recipient's computer system) and a link to the storage location of the detached file is inserted in the message to which it was attached. The link facilitates access to the file so long as the file remains at the storage location.

However, if a user moves the detached file from its original storage location to another location, the link to the file in the message will no longer work. And, unless the user remembers the storage location to which the file was moved, the user may not be able to locate and access the file.

Thus, what is needed is a system, apparatus and method of keeping track of a storage location of an e-mail attachment that has been detached from an e-mail message.

SUMMARY OF THE INVENTION

The present invention provides a system, computer program product and method of keeping track of an attachment that has been detached from an e-mail message. When an attachment is detached from an e-mail message, it is stored at a storage location and a link is inserted into the message to facilitate access to the attachment. In order to keep track of the attachment, the present invention cross-references the attachment to the storage location where it is stored and enters the cross-referenced attachment and the storage location into a cross-referencing table. If the attachment is ever moved from one location to another, the invention will update the cross-referencing table to reflect the new storage location of the attachment. After doing so, the invention will update the link to facilitate access to the attachment at the new storage location.

If instead of being moved from one location to another the attachment is deleted, a statement indicating when and by whom the attachment was deleted will be entered in the e-mail message. Likewise, if the attachment is modified or its title changed, a statement will be inserted in the e-mail message indicating so. If the attachment was merely placed in a trash bin instead of being permanently deleted, a statement will be entered into the e-mail message indicating so. In addition, the invention may restore the attachment if a user so indicates.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5(*a*), 5(*b*) and 5(*c*) are exemplary location tables.

DETAILED DESCRIPTION OF THE PREFERRED EMBODIMENT

Figure 1:
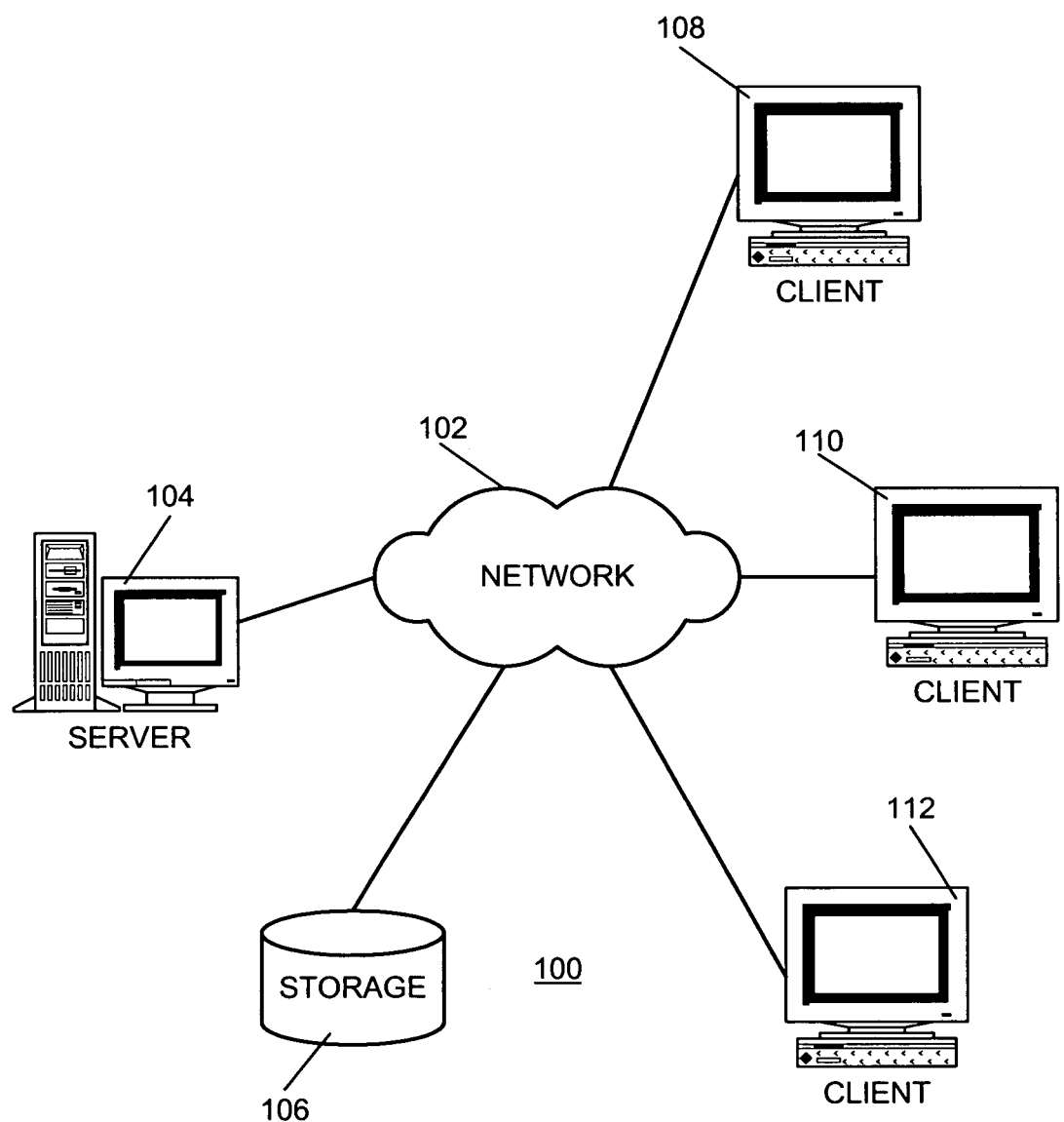
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 may provide data, such as boot files, operating system images, and e-mail messages and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
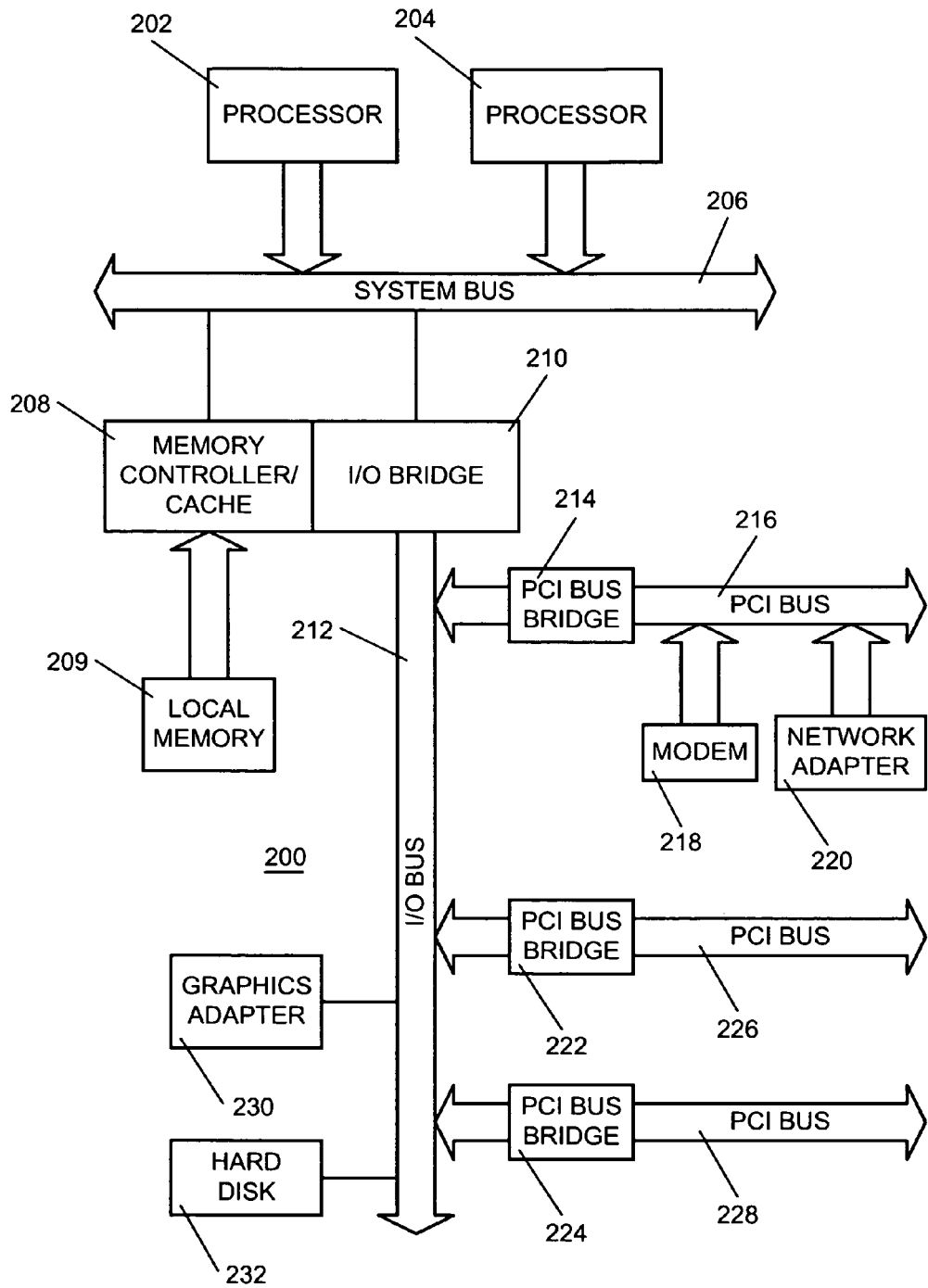
FIG. 2 is an exemplary block diagram of a server apparatus according to the present invention.

Referring to FIG. 2, a block diagram of a data processing system that may be implemented as a mail server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pseries system, a product of International Business Machines Corporation in Armonk, N.Y., running the Advanced Interactive Executive (AIX) operating system or LINUX operating system.

Figure 3:
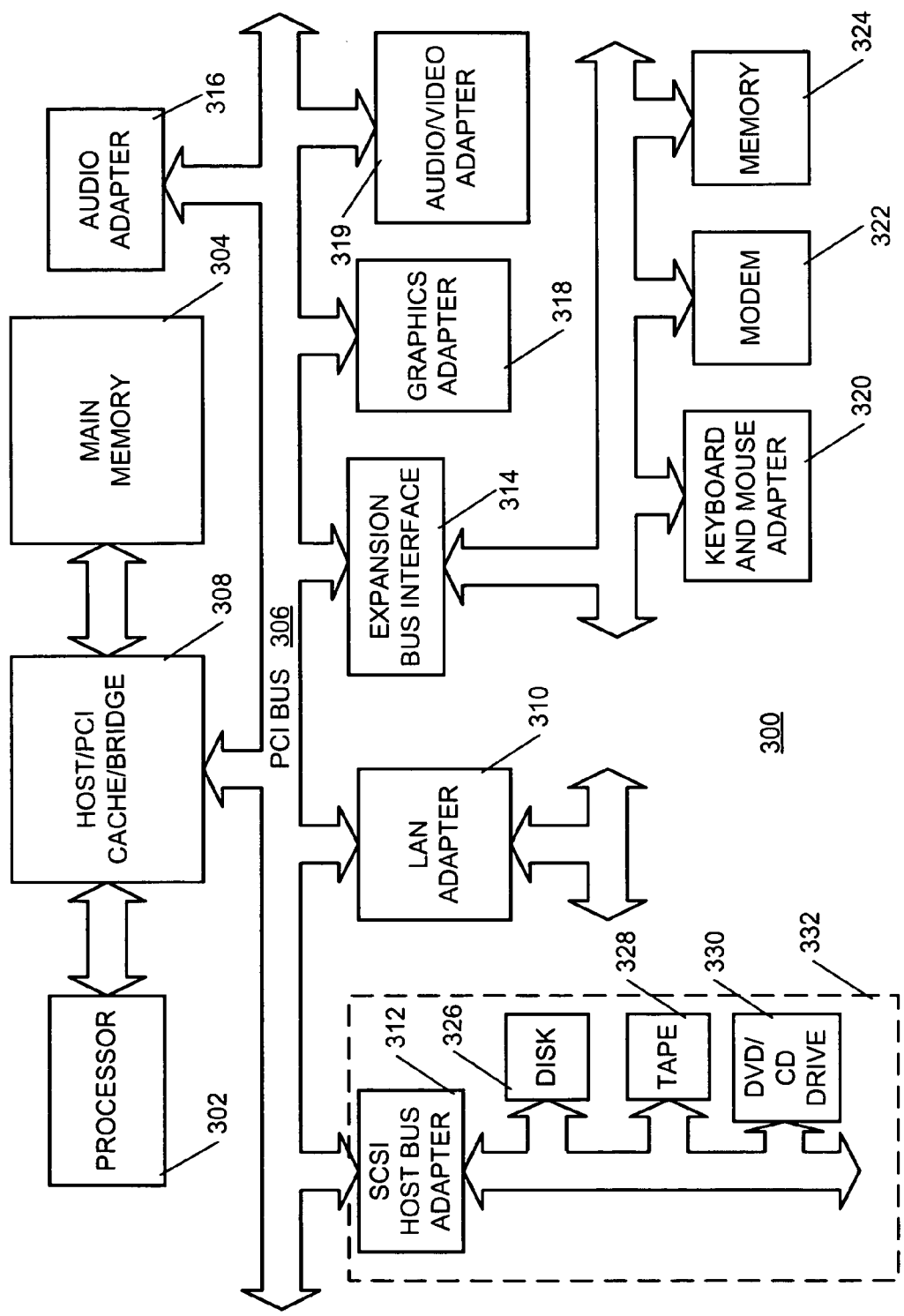
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows® XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides a system, computer program product and method of keeping track of an e-mail attachment that has been detached from an e-mail message. The invention may be local to client systems 108, 110 and 112 of FIG. 1 or to the server 104 or to both the server 104 and clients 108, 110 and 112. Further, the present invention may be embodied in a program product that may reside on any computer readable storage medium (i.e., floppy disk, compact disk, hard disk, ROM, RAM, etc.) used by a computer system. The program product may be physically distributed (e.g., if on a compact disk) or transferred electronically.

Figure 4:
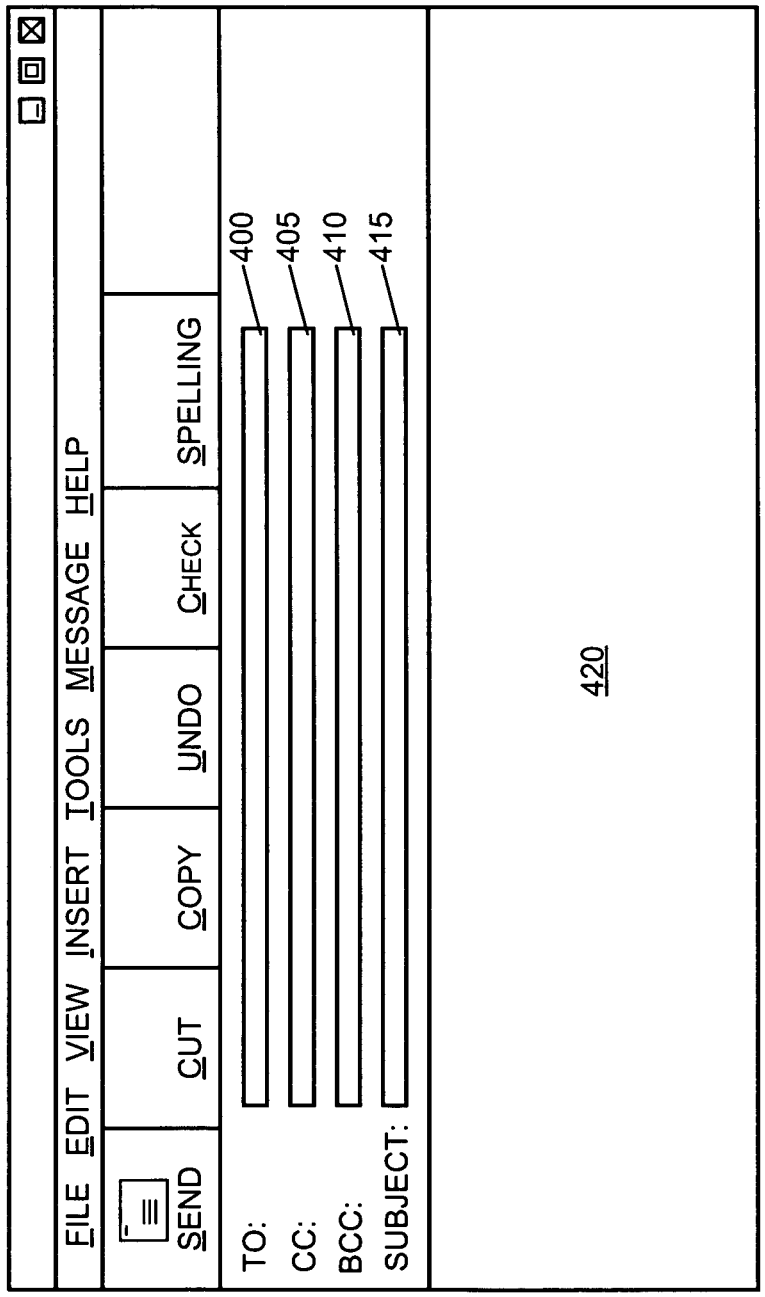
FIG. 4 is an exemplary graphical user interface (GUI) of an e-mail software tool.

FIG. 4 is an exemplary graphical user interface (GUI) of an e-mail software tool. In this figure, only the items that are of importance to the invention are given a reference numeral. The GUI has address box 400, carbon copy box 405, blind copy box 410, subject matter box 415 and message or text area 420. E-mail addresses of intended recipients are entered into address box 400. Carbon copy box 405 is used to enter the e-mail addresses of recipients who need to know what is said in the message; but, the message is not necessarily addressed to them. Blind copy box 410 is used to enter the e-mail addresses of recipients that the user wishes to know about the content of the message, but as with the recipients in address box 405, the message is not addressed to them. Recipients whose e-mail addresses are entered in address box 400 and carbon copy box 405 are aware that they all receive the message. However, they are not aware that the recipients whose e-mail addresses are entered in blind copy box 410 receive the message also. But, the recipients whose e-mail addresses are entered in blind copy box 410 are aware that recipients whose e-mail addresses are entered in address box 400 and carbon copy 405 do receive the message. The subject matter of the message is entered in subject box 415 and the actual message is entered in text area 420.

The information in address box 400, carbon copy box 405 and subject matter box 415 are included in the header of the e-mail. However, because the purpose of blind copy box 410 is to send a message to someone without the other recipients knowing to whom it has been sent, blind copy box 410 recipients should not be put in the message header. In fact, doing so would defeat the purpose of the blind copy box 410, since message headers are viewable. Information in blind copy box 410 is provided directly to SMTP control, without being included in the header. SMTP is short for Simple Mail Transfer Protocol, a protocol for sending e-mail messages between mail servers and between mail clients and mail servers. The information in text area 420 constitutes the body of the message.

Returning to FIG. 1, server 104 may be used as a mail server on which e-mail messages for clients 108, 110 and 112 are stored. As mentioned before, when an electronic file is part of an e-mail message, it is usually attached to the body of the message and sent to the recipients. Once a recipient accesses the e-mail message, the electronic file may be detached from the e-mail message to save storage space on the server 104. The detached electronic file may be stored on the recipient's local computer system (i.e., on one of clients 108, 110 and 112) and a link to the electronic file may be entered into the message to allow access to the file. The link may be a hyperlink or a uniform resource locator (URL), a path to the storage location, an Internet protocol (IP) address or any mechanism that may point to the stored file.

However, if the recipient or anyone else (e.g., an authorized personnel such as a super user or an administrator of the computer system) moves the file from the location where it was originally stored to another location, the recipient may no longer be able to access the file through the link in the message. The present invention allows a recipient to access a detached electronic file through the e-mail message to which it was attached whether or not the file has been moved from the location where it was originally stored. To do so, a location table such as the ones shown in FIGS. 5(a), 5(b) and 5(c) is used.

FIGS. 5(a), 5(b) and 5(c) are exemplary location tables. The table in each of FIGS. 5(a), 5(b) and 5(c) has an "electronic files" column 505, a "location stored" column 510 and an "e-mail message" column 515. Names of detached files are entered in the "electronic files" column 505. The storage location of each detached file is entered in "location stored" column 510 and the e-mail message to which the file was attached is entered in "e-mail message" column 515.

Thus, $file_1$ and $file_2$ in the figures are files that have been detached from e-mail messages. More specifically, $file_1$ was detached from $e\text{-}mail_1$ and stored at $location_1$ on the recipient's client system while $file_2$ was detached from $e\text{-}mail_2$ and stored at $location_2$ (see FIG. 5(a)). Note that although $file_1$ and $file_2$ are shown to have been detached from two different e-mail messages they could have very well been both detached from the same e-mail message since a plurality of electronic files may be attached to one e-mail message. Further, note that in the case where a user is provided access to the location table, the name of the file may be a "live" link that may allow the user access to the file when asserted. Likewise, $e\text{-}mail_1$ and $e\text{-}mail_2$ may also be "live" links that may take the user back to the corresponding e-mail messages when asserted. Also, $e\text{-}mail_1$ and $e\text{-}mail_2$ may contain information about the subject matter of the messages or the name of the sender or the time the message was received.

In any event, if $file_1$ is moved, for instance, from $location_1$ to $location_{a1}$, the invention will update the location table as shown in FIG. 5(b). The location of $file_1$ in FIG. 5(b) is $location_{a1}$ rather than $location_1$ shown in FIG. 5(a).

The invention will also update the location table if a file is deleted. For example, if the recipient or anyone else deletes $file_2$, then the invention will delete the entry of $file_2$ in the location table. This is shown in FIG. 5(c) where there is only the entry of $file_1$ in the table.

After a file has been moved and the table updated, the invention may further update the embedded link to facilitate access to the file at its new storage location. If the file has instead been deleted, the invention may replace the link with a statement. In this case, the statement may be a "dead" link and may read "file was deleted by user or recipient on date," where file is a unique identifier (e.g., the name) of the file, recipient or user is the name of the user who deleted the file and date is the date the file was deleted.

In the case where a file is merely placed in a trash bin instead of being permanently deleted, the statement may read "file was placed in trash bin by user or recipient on date," where file is a unique identifier (e.g., the name) of the file, recipient or user is the name of the user who placed the file in the trash bin and date is the date the file was placed there.

Note that in contrast to the "dead" link represented by the statement that indicates when the file was deleted, the link represented by the statement indicating when the file was placed in the trash bin may be a "live" link. If a user clicks on the statement, the invention may prompt the user to ascertain whether or not the file is to be "undeleted". If the user indicates that the file is to be "undeleted" or restored, the invention may restore the file. After restoring the file, the invention may grant the user access to the file. Restoring files that have been placed in trash bins is very well known in the field and thus is not explained further in the present disclosure.

The invention may also use a "live" link statement if the file is modified. In this case, the statement may read "file was modified by user or recipient on date," where file is a unique identifier (e.g., the name) of the file, recipient or user is the name of the user who modified the file and date is the date the file was modified. Likewise, if the name of the file is changed, a "live" link statement may be used indicating that $name_1$ was changed to $name_2$ by user on date where $name_1$ is the original name of the file and $name_2$ is the new name of the file, user is the name of the user who changed the name of the file and date is the date the name of the file was changed.

Although links have been used to describe the invention, pointers may instead be used. In this case, when a file is stored at a storage location, a pointer will be directed to that location. If the file is moved from one storage location to another, the pointer may be redirected to the new storage location of the file. The statements mentioned above may be placed next to pointers in e-mail messages whenever appropriate.

Note that instead of redirecting a pointer to a file that has been moved, the invention may simply direct the pointer to the "location table" once a file is detached. In this case, the name of the file, as provided by the pointer, may be used to obtain the file's current location from the table each time the recipient is accessing the file from the e-mail message to which the file was attached. The name of the file provided by the pointer may be the same as the name of the file entered in column 505 of the location table in FIGS. 5(a), 5(b) and 5(c). Consequently, the invention may only need to update the "location table" when a file is moved instead of updating both the "location table" and the pointer.

Note also that although a location table is used by the invention, the invention is not thus restricted. The invention may, instead of using a location table to track the location of detached files, simply redirect the pointer to the current location of a file each time the file is moved. Here then the invention will update only the pointer when a file is moved from one location to another.

Note further that the invention may be a plug-in for incorporation into an existing e-mail client or a module of future e-mail clients. Likewise, if the invention is implemented as part of the OS, it may be a plug-in for incorporation into an existing OS or a module of future OSs.

Figure 6:
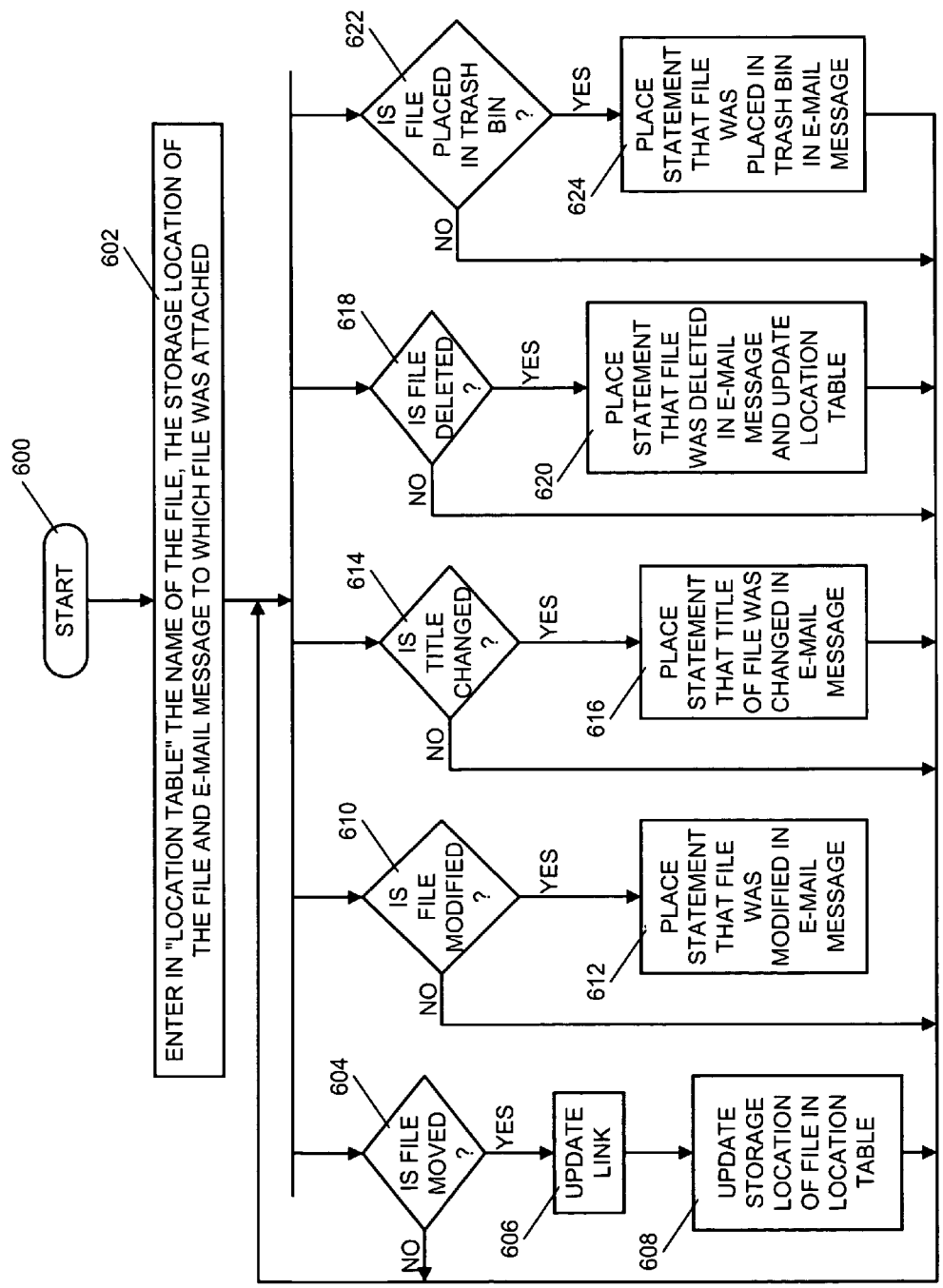
FIG. 6 is a flowchart of a first process that may be used to implement the invention.

FIG. 6 is a flowchart of a process that may be used to implement the invention. The process starts when a file is detached from an e-mail message and a link is inserted into the e-mail message to facilitate access to the detached file (step 600). After the link has been inserted into the e-mail message, the invention may enter into the "location table" the name of the file, the storage location of the file and the e-mail message to which the file was attached (step 602). As mentioned before, the entry of the e-mail message to which the file was attached may be a "live" link that may take a user back to the e-mail message when asserted. Likewise, the name of the file may also be a "live" link that may allow a user access to the file when asserted.

Once the location of the file is entered into the "location table", the invention may continually monitor a user's actions on the file. If the user moves the file to a different location, the invention will update the "location table" to reflect the new storage location of the file and update the link in the e-mail message (steps 604, 606 and 608). If the user modifies the file, the invention will enter a statement in the e-mail message indicating that the file has been modified (steps 610 and 612). If the user changes the name of the file, the invention will enter a statement in the e-mail message indicating that the name of the file has been changed (steps 614 and 616). If the user permanently deletes the file, the invention will enter a statement in the e-mail message indicating that the file has been deleted and update the location table (steps 618 and 620). If instead the user merely placed the file in the trash bin, the invention will enter a statement in the e-mail message indicating that the file has been placed in the trash bin (steps 622 and 624). After performing any one of the functions disclosed above, the process may go back to monitor the user's action on the file. The process may end when the computer system on which it is installed is turned off or is reset.

Note that before the invention allows a user to delete a file, the invention may request confirmation that the user really wants to delete the file. After the confirmation, the invention may allow the file to be deleted. Likewise, before the invention allows a user to modify a file, to place a file in the trash bin, to change the title of the file etc. the invention may request confirmation from the user.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of keeping track of an attachment to an email message, the attachment having a name and having been stored at an original storage location on a system, the e-mail message having a link inserted therein to the original storage location, the method comprising:

determining whether the attachment is moved from the original storage location to a new storage location, the new storage location including a trash bin; and updating the link inserted in the e-mail message to facilitate access to the attachment at the new storage location, wherein updating the link includes:

inserting a first statement into the e-mail message indicating when and by whom the attachment was moved to the trash bin in response to the attachment being moved to the trash bin; or inserting a second statement into the e-mail message indicating when and by whom the attachment was deleted in response to the attachment being deleted and not being moved to the trash bin and replacing the link inserted in the e-mail message with the second statement.

2. The method of claim 1 wherein a reference table in which the name of the attachment and the original storage location are cross-referenced to each other is used, the original storage location being changed to the new storage location when the attachment is moved to the new storage location.

3. The method of claim 2 wherein the reference table is further used to cross-reference the name and the storage location of the attachment to the e-mail message by inserting a name for the e-mail message in the reference table, the name of the attachment in the reference table is a first link that provides a user access to the attachment in response to the user asserting the first link in the reference table and the name for the e-mail message in the reference table is a second link that provides the user access to the e-mail message in response to the user asserting the second link in the reference table.

4. The method of claim 1, wherein when the attachment stored at the original storage location or at the new storage location is moved to the trash bin and a user clicks on the link inserted in the e-mail message, the user is prompted to indicate whether or not the attachment is to be restored and in response to the user indicating that the attachment is to be restored, restoring the attachment.

5. The method of claim 1 wherein in response to the name of the attachment being changed, inserting a third statement into the e-mail message indicating when and by whom the name of the attachment was changed.

6. The method of claim 1 wherein in response to the attachment stored at the original storage location or at the new storage location being modified, inserting a fourth statement into the e-mail message indicating when and by whom the attachment was modified.

7. A computer program product stored on a computer readable storage medium for keeping track of an attachment to an e-mail message, the attachment having a name and having been stored at an original storage location on a system, the e-mail message having a link inserted therein to the original storage location, the computer program product comprising:

code data for determining whether the attachment is moved from the original storage location to a new storage location, the new storage location including a trash bin; and code data for updating the link inserted in the e-mail message to facilitate access to the attachment at the new storage location, wherein updating the link includes:

inserting a first statement into the e-mail message indicating when and by whom the attachment was moved to the trash bin in response to the attachment being moved to the trash bin; or inserting a second statement into the e-mail message indicating when and by whom the attachment was deleted in response to the attachment being deleted and not being moved to the trash bin and replacing the link inserted in the e-mail message with the second statement.

8. The computer program product of claim 7 wherein a reference table in which the name of the attachment and the original storage location are cross-referenced to each other is used, the original storage location being changed to the new storage location when the attachment is moved to the new storage location.

9. The computer program product of claim 8 wherein the reference table is further used to cross-reference the name and the storage location of the attachment to the e-mail message by inserting a name for the e-mail message in the reference table, the name of the attachment in the reference table is a first link that provides a user access to the attachment in response to the user asserting the first link in the reference table and the name for the e-mail message in the reference table is a second link that provides the user access to the e-mail message in response to the user asserting the second link in the reference table.

10. The computer program product of claim 7 wherein when the attachment stored at the original storage location or at the new storage location is moved to the trash bin and a user clicks on the link inserted in the e-mail message, the user is prompted to indicate whether or not the attachment is to be restored and in response to the user indicating that the attachment is to be restored, restoring the attachment.

11. The computer program product of claim 7 wherein in response to the name of the attachment being changed, inserting a third statement into the e-mail message indicating when and by whom the name of the attachment was changed.

12. The computer program product of claim 7 wherein in response to the attachment stored at the original storage location or at the new storage location being modified, inserting a fourth statement into the e-mail message indicating when and by whom the attachment was modified.

13. A system for keeping track of an attachment to an e-mail message, the attachment having a name and having been stored at an original storage location on the system, the e-mail message having a link inserted therein to the original storage location, the system comprising:
    at least one storage device for storing code data; and
    at least one processor for processing the code data to determine whether the attachment is moved from the original storage location to a new storage location, the new storage location including a trash bin, and to update the link inserted in the e-mail message to facilitate access to the attachment at the new storage location, wherein updating the link includes:
    inserting a first statement into the e-mail message indicating when and by whom the attachment was moved to the trash bin in response to the attachment being moved to the trash bin; or
    inserting a second statement into the e-mail message indicating when and by whom the attachment was deleted in response to the attachment being deleted and not being moved to the trash bin and replacing the link inserted in the e-mail message with the second statement.

14. The system of claim 13 wherein a reference table in which the name of the attachment and the original storage location are cross-referenced to each other is used, the original storage location being changed to the new storage location when the attachment is moved to the new storage location.

15. The system of claim 14 wherein the reference table is further used to cross-reference the name and the storage location of the attachment to the e-mail message by inserting a name for the e-mail message in the reference table, the name of the attachment in the reference table is a first link that provides a user access to the attachment in response to the user asserting the first link in the reference table and the name for the e-mail message in the reference table is a second link that provides the user access to the e-mail message in response to the user asserting the second link in the reference table.

16. The system of claim 13 wherein when the attachment stored at the original storage location or at the new storage location is moved to the trash bin and a user clicks on the link inserted in the e-mail message, the user is prompted to indicate whether or not the attachment is to be restored and in response to the user indicating that the attachment is to be restored, restoring the attachment.

17. The system of claim 13 wherein in response to the name of the attachment being changed, inserting a third statement into the e-mail message indicating when and by whom the name of the attachment was changed.

18. The system of claim 13 wherein in response to the attachment stored at the original storage location or at the new storage location being modified, inserting a fourth statement into the e-mail message indicating when and by whom the attachment was modified.

\* \* \* \* \*